United States Patent [19]

Frazier

[11] Patent Number: 4,758,972
[45] Date of Patent: Jul. 19, 1988

[54] PRECISION ROUNDING IN A FLOATING POINT ARITHMETIC UNIT

[75] Inventor: Malcolm Frazier, Medfield, Mass.

[73] Assignee: Raytheon Company, Lexington, Mass.

[21] Appl. No.: 869,861

[22] Filed: Jun. 2, 1986

[51] Int. Cl.[4] ............................................... G06F 7/50
[52] U.S. Cl. .................................................. 364/745
[58] Field of Search .................................. 364/745, 748

[56] References Cited

U.S. PATENT DOCUMENTS

| | | | |
|---|---|---|---|
| 3,434,114 | 3/1969 | Arulpragasam et al. | 364/900 |
| 3,594,565 | 7/1971 | Ragen | 364/745 |
| 3,725,649 | 4/1973 | Deerfield | 364/748 |
| 3,842,250 | 10/1974 | Anderson | 364/745 |
| 3,885,141 | 5/1975 | Kieburtz | 364/745 |
| 4,208,722 | 6/1980 | Rasala et al. | 364/760 |
| 4,295,203 | 10/1981 | Joyce | 364/748 |
| 4,468,748 | 8/1984 | Blau et al. | 364/748 |
| 4,476,537 | 10/1984 | Blau et al. | 364/748 |
| 4,534,010 | 8/1985 | Kobayashi et al. | 364/748 |
| 4,562,553 | 12/1985 | Mattedi et al. | 364/745 |

OTHER PUBLICATIONS

J. Michael Yohe, "Roundings in Floating-Point Arithmetic", *IEEE Transactions on Computers*, vol. C-22, No. 6, Jun. 1973, pp. 577-586.

IEEE Computer Society Computer Standards Committee, "A Proposed Standard for Binary Floating-Point Arithmetic", Draft 10.0 of IEEE Task P754, Dec. 2, 1982.

*Primary Examiner*—David H. Malzahn
*Attorney, Agent, or Firm*—Walter F. Dawson; Richard M. Sharkansky

[57] ABSTRACT

A floating point computation unit having an arithmetic unit employing two guard digits for preserving information needed for rounding and an indicator generator for providing an indicator signal to a precision rounding apparatus. The indicator generator detects any digits beyond the guard digits of a shifted operand instead of waiting to detect such digits in the mantissa produced by an add or subtract cycle. The indicator generator comprises a priority encoder network coupled to a comparator for determining whether or not the least significant digits beyond the guard digits of the shifted mantissa are all zeros.

17 Claims, 3 Drawing Sheets

| S | O | nM | G1 | G2 | I |

WHERE:  S = SIGN OF RESULT
O = OVERFLOW DIGIT
nM = n DIGIT SUM (FOR n MANTISSA DIGITS IN OPERANDS)
G1,G2 = GUARD DIGITS
I = INDICATOR (SET IF THERE ARE ANY NONZERO DIGITS BEYOND THE SECOND GUARD DIGIT)

PRECISION ROUNDING IN A FLOATING POINT ARITHMETIC UNIT

BACKGROUND OF THE INVENTION

This invention relates generally to arithmetic operations in digital computing equipment and in particular to an apparatus and method of performing precision rounding in digital floating point arithmetic.

As is known in the art, a floating point number comprises an exponent portion and a mantissa portion. The exponent portion represents the exponent to which a base number is raised and the actual number is interpreted to be the mantissa portion multiplied by the base number raised to a power specified by the exponent portion. Thus any particular digital number may be expressed as (M,E) where M is a n-digit signed mantissa and E is an m-digit signed integer exponent or $M \times B^E$ where B represents the base number system which in many computer systems is the binary number system where B=2 and in other computer systems B=10 (decimal) or 16 (hexadecimal).

A nonzero floating point number is said to be normalized if its mantissa contains the maximum possible amount of significance. In other words, a normalized floating point number has a value other than "zero" as the left most significant digit in its mantissa. A normalization process for any floating point digital number comprises the steps of shifting the floating point to its proper position in the mantissa and changing the exponent so that the value of the combination of mantissa and exponent remains constant.

Floating point numbers may be added, subtracted, multiplied or divided. When addition or subtraction is to be performed, normalized floating point numbers with different exponents are processed by changing the exponents of the digital numbers to be processed until such exponents are the same and shifting the mantissas with respect to each other a corresponding amount (to maintain the values of the two numbers) and then adding, or subtracting if desired, the adjusted mantissas. The resulting sum or difference of the adjusted mantissa when combined with the adjusted exponent is the desired sum or difference, if none of the significant digits in the original mantissas are lost.

In a practical computer however, arithmetic operations get complicated by the fact that the mantissa portion of a number does not have infinite precision and it is normally processed in a register comprising a fixed number of digits referred to as "n" digits. Although two input operands to be added together may be considered to be exact, the result of the addition operation often creates more than n significant digits. The problem then is to squeeze an accurate representation of the sum into n digits by the processes of normalization and rounding.

If greater than n digits remain after normalization, older computers often either discard the remaining digits or truncate them before the addition takes place. In more recent computers, precision rounding requires that the computation must be performed as if all digits of the sum were retained. For example, if the remaining digits after the n'th digit represent less than $\frac{1}{2}$ of the n'th digit in value, they are discarded. If more than $\frac{1}{2}$ is represented, then one is added to the least significant digit of the n digits retained. If precisely $\frac{1}{2}$ is represented then the rounding may go either way. In "balanced rounding" an attempt is made to round just half the time as proposed in IEEE Standard 754 for Binary Floating-Point Arithmetic. Barrel shifters with a wide OR gate have been used to perform precision rounding but require considerable hardware; alternatively, a flag bit known as a "sticky bit" has been used in machines implementing floating point with serial shift registers, which was used as a simple means of detecting when a "one" was shifted into it, but this is a slow operation.

SUMMARY OF THE INVENTION

In accordance with the present invention a floating point computation unit is provided having an improved apparatus and method for performing precision rounding during an addition or a subtraction arithmetic operation. Two guard digits are provided for maintaining precision of a shifted operand and an indicator generator monitors n−1 digits shifted beyond the guard digits generating an indicator signal for the precision rounding operation when the n−1 monitored digits are not all zeros. The indicator generator comprises a zero detect means implemented with priority encoder devices and a comparator means producing the indicator signal with minimal hardware. The invention is based on a known premise that an arithmetic unit of 2n+1 digits is sufficient to perform precision rounding on n digits. However, the present invention avoids having a 2n+1 digit arithmetic-logic unit to generate a 2n+1 digit sum. Also, the precision rounding information provided by the indicator signal is available earlier in a floating point arithmetic operation cycle thereby permitting a shortened addition or subtraction time.

In accordance with a further feature of the invention a method is provided for performing a precision rounding operation during an arithmetic operation in a floating point computation unit comprising the steps of processing a first mantissa and a second mantissa of a pair of floating point numbers, processing a first exponent and a second exponent of the pair of floating point numbers, generating a first signal identifying the larger exponent being processed, generating a second signal representing the magnitude of the arithmetic difference between the exponent of said numbers being processed, adjusting the mantissa of one of the floating point numbers in response to the second signal, generating an indicator signal when a specified number of least significant digits of the adjusted mantissa are not all zeros, the number of the least significant digit being specified by the second signal, and performing normalization and precision rounding on a resulting mantissa from an arithmetic-logic unit means, said precision rounding being performed in accordance with the resulting mantissa from the first mantissa and second mantissa processing and the indicator signal. The step of generating the indicator signal further comprises the steps of detecting a plurality of consecutive digits of said specified number of least significant digits having all zeros in accordance with the second signal, comparing the zero detect output to the second signal representing the magnitude of the arithmetic difference between the exponents of the numbers being processed, and generating the indicator signal when the magnitude of the arithmetic difference is greater than the detected plurality of consecutive zero digits.

BRIEF DESCRIPTION OF THE DRAWINGS

Other and further features of the invention will become apparent in connection with the accompanying drawings wherein.

DESCRIPTION OF THE PREFERRED EMBODIMENTS

Figure 1:
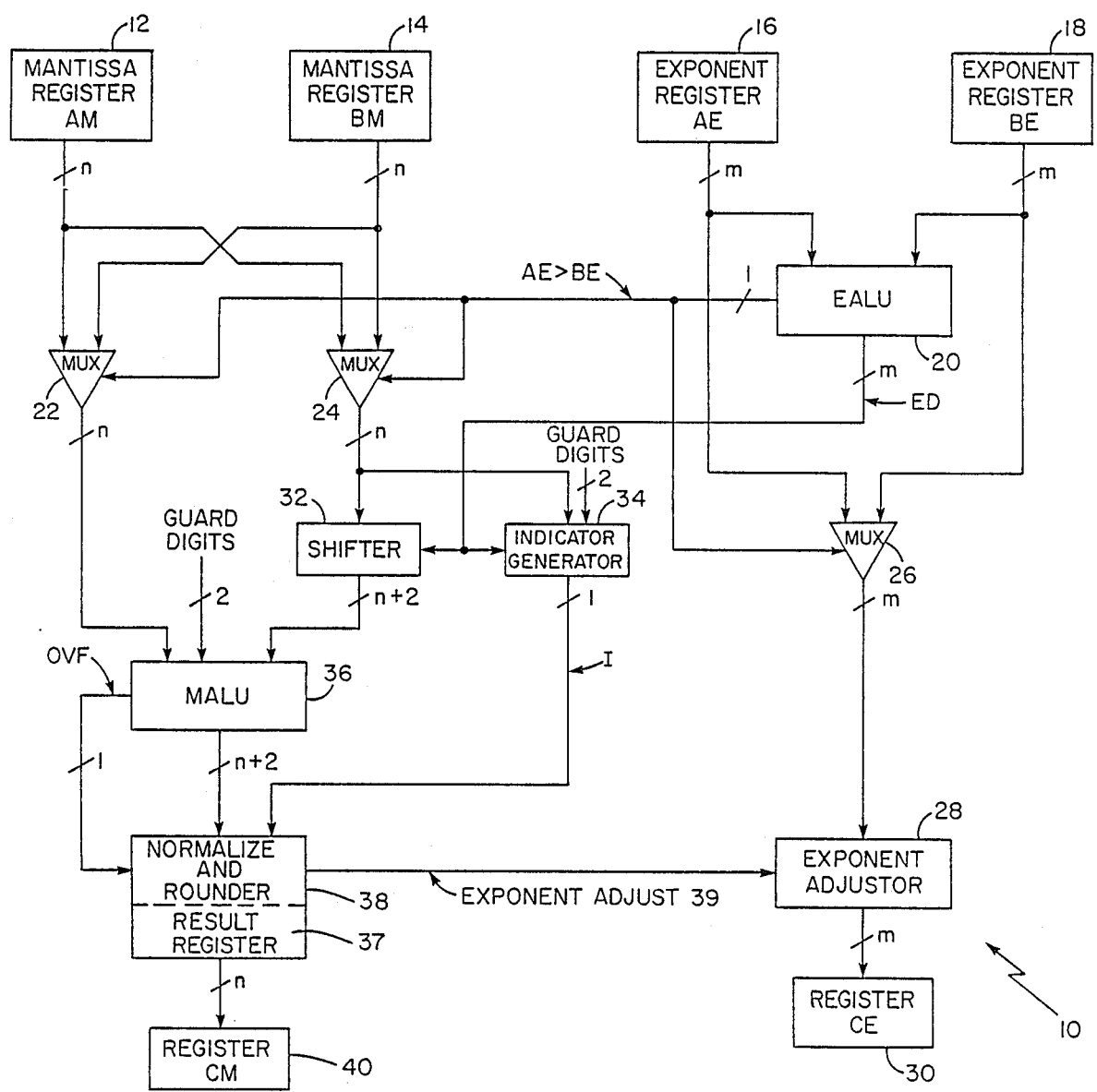
FIG. 1 is a block diagram of a floating point arithmetic unit embodying the invention.

Referring now to FIG. 1, a floating point arithmetic unit 10 having precision rounding capability operable in accordance with the present invention is shown. Registers 12-18 provide temporary storage for the floating point numbers to be operated on. Registers 12 and 14 store the mantissa portions AM and BM of two floating point numbers A and B and registers 16 and 18 store the exponent portions AE and BE of the two floating point numbers A and B. The mantissa registers 12, 14 are each n digits wide and the exponent registers 16 and 18 are each m digits wide. The outputs of the exponent registers are coupled to the inputs of an exponent arithmetic-logic unit (EALU) 20 and a multiplexer (MUX) 26. Multiplexer 26 along with multiplexers 22 and 24 are controlled by a signal from the EALU 20 called AE>BE; this signal results from a comparison of the two exponents AE and BE which may generate a borrow resulting from the difference between the two exponents, and thereby gating multiplexer 24 such that the mantissa with the smaller exponent is transferred from mantissa register 12 or mantissa register 14 to the shifter 32 and indicator generator 34. If the exponents are equal, then the mantissa register 14 is chosen arbitrarily as an input to the shifter 32 and indicator generator 34 (since it makes no difference which is selected). A magnitude of the exponent difference (ED) produced by the EALU 20 is coupled to a shifter 32 and indicator generator 34. The AE>BE signal selects at multiplexer 26 the larger exponent and couples the larger exponent to an exponent adjustor 28 which holds the resulting exponent until a normalization operation occurs if such an operation is required. The output from the exponent adjustor 28 is coupled to register CE 30 which provides temporary storage for the exponent result of a current arithmetic operation.

The outputs of the mantissa registers 12 and 14 are coupled to multiplexers 22 and 24 and the outputs of both multiplexers 22 and 24 are selected by the AE>BE signal generated by EALU 20. The particular mantissa selected by multiplexer 22 having n digits is coupled to a first input of a mantissa arithmetic-logic unit (MALU) 36. Two guard digits G1 and G2 having zero value are generated and also fed to said first input of the MALU 36 in the least significant digit position. The second input of the MALU 36 is coupled to the output of shifter 32 which takes n digits from one of the mantissa registers 12 and 14 and m digits of the magnitude of the exponent difference (ED) and generates an n+2 digit mantissa to the second input of MALU 36. The n+2 digit mantissa comprises the shifted original mantissa having n digits plus the 2 guard digits for preserving precision. The m digits of the magnitude of the exponent difference (ED) are also coupled to the indicator generator 34 along with the same n digits of the original mantissa. The indicator generator 34 generates an indicator signal, I, if the remaining n−1 digits of a true 2n+1 digit sum are not all zeros. It has been shown by J. Michael Yohe in "Roundings in Floating-Point Arithmetic", IEEE Transactions on Computers, Vol. C-22, No. 6, June 1973, p. 577-586 that an arithmetic unit of 2n+1 digits is sufficient to perform precision rounding on n digits. In the present invention, the 2n+1 sum is never actually performed because the same result can be achieved by examining the operand that is transferred through multiplexer 24 (which is the smaller magnitude of the operands being processed) and determining if the last ED-2 digits do not contain all zeros. The I signal from indicator generator 34 is coupled to a normalize and rounder 38 which also receives an n+2 digit output generated by the MALU 36 and an overflow (OVF) signal from the MALU 36. Given the I signal, the normalize and round method is known to one skilled in the art and described in the above-referenced IEEE article by J. Michael Yohe and "A Proposed Standard for Binary Floating Point Aritmetic", Draft 10.0 of IEEE Task P754, Dec. 2, 1982. The normalize and rounder 38 performs any necessary shifting and precision rounding, and an exponent adjustor 39 signal output is coupled to the exponent adjustor 28 for adding to or subtracting from the result exponent being held in the exponent adjustor 28 prior to being transferred to the exponent storage register (CE) 30. The normalized and rounded result mantissa is transferred and stored in register (CF) 40.

Still referring to FIG. 1, it is well known to one skilled in the art that in floating point addition when two numbers are to be added, their exponents may be different. Therefore, the representation of one of them (usually the one with the smaller exponent) is modified by dividing the mantissa by the base and altering the exponent until both exponents are equal; then the mantissas can be added together. Shifter 32 performs this alteration. However, in an actual computer this operation becomes complicated by the fact that the mantissas do not have infinite precision, but are normally stored in registers containing a fixed number of digits, n, such as registers 12 and 14. When the addition is begun, the two input operands are considered to be exact but the result of the addition operation may create more than n significant digits. The problem then is to provide an accurate representation of this sum within n digits which is accomplished by the processes of normalization and precision rounding.

The normalization and rounding operations performed by the normalize and rounder 38 as shown in FIG. 1 are performed sequentially. The normalization operation looks for the most significant digit of the sum and then counts off the first n−1 digits after the most significant digit. At this point some computers have discarded the remaining digits or even truncated them before the addition takes place. Then, the precision rounding methodology as performed in the present invention requires that the computation be performed as if all digits of the sum are retained. If the remaining digits after the n'th digit represent less than ½ of the n'th digit in value, they are discarded. If they are more than ½ in value, then one is added to the least significant digit of the number retained. If the remaining digits are equal to precisely ½, then the action may go either way. The proposed IEEE Standard 754 for Binary Floating-Point Arithmetic calls for rounding to occur in this case just half the time.

Figures 2, 3:
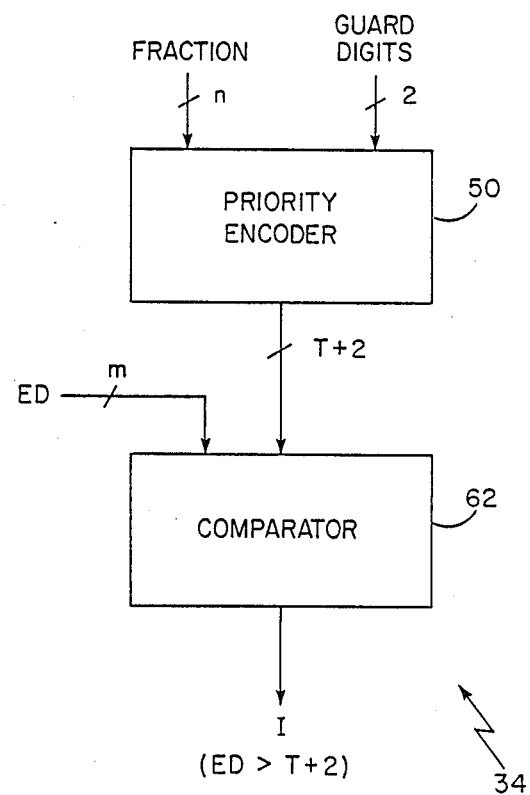
FIG. 2 shows the digits required in a result register of the floating point arithmetic unit for precision rounding.
FIG. 3 is a block diagram of an indicator generator of the invention.

Referring now to FIG. 2 the digit positions of a result register 37 within the normalize and rounder 38 are shown. The S digit is a sign of a mantissa, the O digit represents an overflow condition, nM represents the mantissa digit sum for operands having n mantissa digits, the G1 and G2 digits are guard digits and the I bit represents the indicator signal to show whether there are any non-zero digits beyond the second guard digit.

Figure 4:
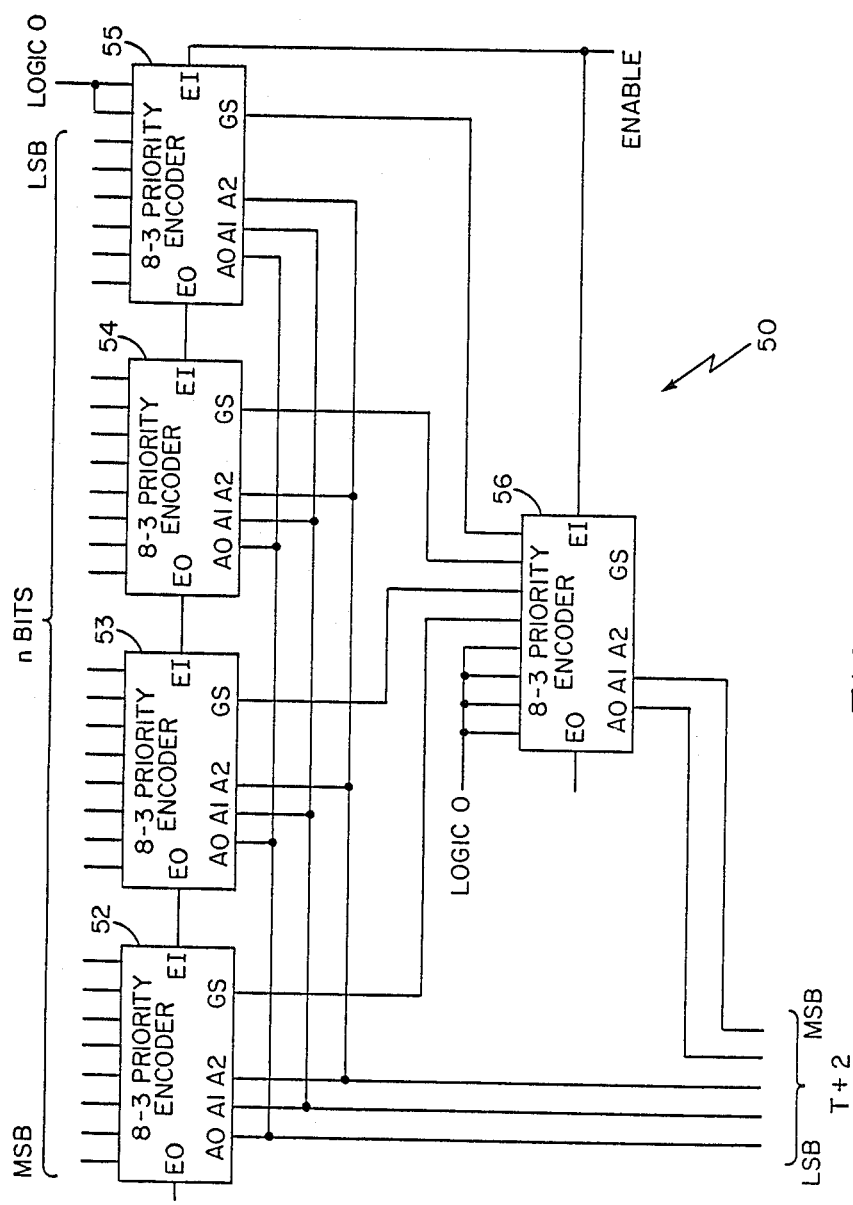
FIG. 4 is a block diagram of a preferred embodiment of the priority encoder shown in FIG. 3.

Referring now to FIGS. 3 and 4, a block diagram of the preferred embodiment of the indicator generator 34 is shown in FIG. 3 comprising a priority encoder 50 coupled to a comparator 62. The indicator generator 34 operates on the same inputs as the shifter 32, but generates a single bit indicator, I, when the last n−1 digits of a true 2n+1 digit sum are not all zero. However, as previously noted this indicator, I, is generated by examining the operand mantissa selected by multiplexer 24 shown in FIG. 1 and determining in the indicator generator 34 if the exponent difference (ED) minus the two guard digits (ED-2) of this mantissa contains all zeros. This invention permits the use of an MALU 36 having only n+2 digits instead of 2n+1 digits which is an important feature of the invention. The indicator signal, I, is fed to the normalize and rounder 38 as shown in FIG. 1 where it participates in the precision rounding operation.

The priority encoder 50 may be embodied with a plurality of 8-line to 3-line priority encoders, type SN74LS348 as manufactured by Texas Instruments of Dallas, Tx. 75222. FIG. 4 shows a preferred embodiment of priority encoder 50 using five 8-line to 3-line priority encoders 52 to 56 for determining that no ones have been lost during alignment shifting of binary numbers by detecting the number of consecutive trailing zeros. Such a circuit configuration is known to one skilled in the art. The input to the priority encoder 50 comprises an n bit mantissa plus two trailing zero bits. The output of the priority encoder 50 is represented by signal T+2 where T is the number of trailing zeros in the n bits of the mantissa and would ordinarily be compared to ED-2 where the "minus two" accounts for the two guard digits. However, to avoid providing another arithmetic-logic unit to perform another addition operation, the priority encoder 50 actually generates T+2 which compensates for the two guard digits and facilitates detection beyond the two guard digits. Signal T+2 is fed to a comparator 62 along with the magnitude of the exponent difference (ED) or shift amount represented by m digits; if ED>T+2, then the I signal is generated indicating that the last ED-2 digits are not all zeros.

In order to demonstrate that 2n+1 digits are sufficient to perform precision rounding on n digits the following critical addition and subtraction operation examples are shown. For the addition operation assume the number of digits equals 4 (n=4) and add each one of the fractions 15/32, 16/32 and 18/32 to the number 13 in the binary number system. After alignment these operations are shown in Tables 1A, 1B and 1C.

TABLE 1A

| n | G1 | G2 | n − 1 |
|---|---|---|---|
| 1101 | 0 | 0 | 000 |
| +0000 | 0 | 1 | 111 |
| 1101 | (0 | 1 | 111) |
| | < ½ | | |

TABLE 1B

| n | G1 | G2 | n − 1 |
|---|---|---|---|
| 1101 | 0 | 0 | 000 |

TABLE 1B-continued

| n | G1 | G2 | n − 1 |
|---|---|---|---|
| +0000 | 1 | 0 | 000 |
| 1101 | (1 | 0 | 000) |
| | = ½ | | |

TABLE 1C

| n | G1 | G2 | n − 1 |
|---|---|---|---|
| 1101 | 0 | 0 | 000 |
| +0000 | 1 | 0 | 010 |
| 1101 | (1 | 0 | 010) |
| | > ½ | | |

In Table 1A, 1B and 1C the binary point is just to the right of the fourth binary digit (counting from left to right). The portion of the result in Table 1A to the right of the binary point is less than ½ so clearly no rounding is required and these digits are discarded. In Table 1C the portion of the result to the right of the binary point is greater than ½ so a round operation must occur by adding one to the least significant digits of the n number retained. In Table 2B the portion of the result to the right of the binary point equals ½; therefore, for precision rounding, a round operation is performed half the time such a condition is detected. In order to distinguish between the examples in Table 2B and Table 2C, the n−1 digits (the last 3 digits) of the extended sum after the guard digits are examined; if any of these digits are non-zero, then the condition of Table 1C exists. However, the same decision can be reached by examining the corresponding digits of the addend which is the basis for the present invention.

For the case of subtraction, critical subtract operation examples are shown in Tables 2A, 2B and 2C whereby each one of the fractions 7/32, 8/32 and 9/32 is subtracted from 8 respectively in the binary number system and the effect of normalization (N) is shown.

TABLE 2A

| n | G1 | G2 | n − 1 |
|---|---|---|---|
| 1000 | 0 | 0 | 000 |
| −0000 | 0 | 0 | 111 |
| 0111 | 1 | 1 | 001 |
| (N)1111 | (1 | 0 | 010) |
| | > ½ | | |

TABLE 2B

| n | G1 | G2 | n − 1 |
|---|---|---|---|
| 1000 | 0 | 0 | 000 |
| −0000 | 0 | 1 | 000 |
| 0111 | 1 | 1 | 000 |
| (N)1111 | (1 | 0 | 000) |
| | = ½ | | |

TABLE 2C

| n | G1 | G2 | n − 1 |
|---|---|---|---|
| 1000 | 0 | 0 | 000 |
| −0000 | 0 | 1 | 001 |
| 0111 | 1 | 0 | 111 |
| (N)1111 | (0 | 1 | 110) |
| | < ½ | | |

The resulting number after normalization is shown in Tables 2A, 2B and 2C with the prefix (N). Again the binary point is just to the right of the fourth binary digit (counting from left to right). In Table 2A the portion of the result to the right of the binary point is greater than ½ necessitating a round operation. In Table 2B the portion of the result to the right of the binary point equals ½ which is the situation for precision rounding where a decision has to be made. If the IEEE standard for precision rounding in floating point arithmetic is followed, then a one is added to the retained result in order to produce an even number. In Table 2C the portion of the result to the right of the binary point is less than ½ so no rounding is required and these digits are discarded.

This concludes the description of the preferred embodiment. However, many modifications and alterations will be obvious to one of ordinary skill in the art without departing from the spirit and scope of the inventive concept. For example, the priority encoder 50 in FIG. 3 may be embodied by a large scale integrated (LSI) implementation of the logic equations implied by the embodiment shown in FIG. 4. Therefore, it is intended that the scope of this invention be limited only by the appended claims.

What is claimed is:

1. A floating point computation unit performing a precision rounding operation during an arithmetic operation comprising:
    means for processing a first mantissa and a second mantissa of floating point numbers;
    means for processing a first exponent and a second exponent of said floating point numbers, said exponent processing means generating a first signal identifying the larger exponent being processed when said first exponent and said second exponent are not equal, said first signal being coupled to said mantissa processing means, and said exponent processing means generating a second signal representing the magnitude of an arithmetic difference between the exponents of said numbers being processed;
    said mantissa processing means comprising a shifter means for adjusting the mantissa of one of said floating point numbers in response to said second signal generated by said exponent processing means;
    an indicator generator means, coupled to said shifter means and being fed by a selected one of either said first mantissa or said second mantissa, for generating an indicator signal when a plurality of least significant digits of said selected mantissa are not all zeros, the number of said least significant digits being specified by said second signal generated by said exponent processing means; and
    means for performing normalization and said precision rounding on an unnormalized resulting mantissa from said mantissa processing means, said preceision rounding of said resulting mantissa being performed in accordance with said indicator signal.

2. The floating point computation unit recited in claim 1 wherein:
    said mantissa processing means further comprises multiplexer means for selecting either said first mantissa or said second mantissa in response to said first signal 6 generated by said exponent processing means for coupling to said shifter means.

3. The floating point computation unit recited in claim 2 wherein:
    said mantissa processing means further comprises an arithmetic-logic unit means for performing addition and subtraction arithmetic operations.

4. The floating point computation unit recited in claim 3 wherein:
    said arithmetic-logic unit means comprises a first input fed by the one of said first mantissa or said second mantissa not being coupled to said shifter means plus two guard digits and a second input fed by an output from said shifter means having n+2 digits; and
    said arithmetic-logic unit means generates an n+2 digit output signal and an overflow signal coupled to said normalization and preceision rounding means.

5. The floating point computation unit recited in claim 4 wherein:
    a register means coupled to said noramlization and precision rounding means stores an n digit mantissa of a floating point number resulting from said arithmetic operation.

6. The floating point computation unit recited in claim 1 wherein:
    said indicator signal generator means comprises means for detecting a plurality of least significant consecutive digits not having all zero digits; and
    a comparator means coupled to said detecting means for comparing an output from said detecting means to said second signal from said exponent processing means representing the magnitude of the arithmetic difference between the exponent of the numbers being processed.

7. The floating point computation unit recited in claim 6 wherein:
    said zero digits detecting means comprises a plurality of priority encoder means.

8. The floating point computation unit recited in claim 1 wherein:
    said exponent processing means generates an output exponent based on the larger of the exponent of the floating point numbers being processed; and
    an exponent adjustor means being fed by said output exponent of said exponent processing means for adjusting said output exponent in accordance with an exponent adjust signal generated by said normalization and precision rounding means.

9. The floating point computation unit recited in claim 8 wherein:
    a register means being fed by an output of said exponent adjustor means stores an exponent resulting from said arithmetic operation.

10. A floating point computation unit for processing floating point numbers having an exponent processor, a mantissa processor with guard digit positions for preserving precision and a precision rounding apparatus comprising:
    means for shifting a mantissa operand of said floating point numbers in said mantissa processor;
    means coupled to said mantissa processor for generating a magnitude of an arithmetic difference between the exponents of said floating point numbers being processed in said exponent processor;
    means coupled between said mantissa processor and said exponent processor for detecting a number of zeros beyond one or more of said guard digit positions after shifting said mantissa operand in accordance with said generated magnitude of the arithmetic difference between the exponents of said floating point numbers being processed;

said detecting means comprising means for comparing the number of digit positions said mantissa operand is shifted to an output of said zero detecting means, said comparing means providing an indicator signal when said number of shifted digit positions is greater than said zero detecting means output; and means coupled to said mantissa processor and said detecting means for performing precision rounding in accordance with said indicator signal from said detecting means, said indicator signal identifying the presence or absence of a trailing least significant nonzero digit beyond the guard digit position.

11. The floating point computation unit recited in claim 10 wherein:

said zero detecting means comprises a plurality of priority encoding means.

12. A method of performing a precision rounding operation in a floating point computation unit comprising the steps of:

processing a first mantissa and a second mantissa of floating point numbers to provide an unnormalized resulting mantissa;

processing a first exponent and a second exponent of said floating point numbers;

generating a first signal identifying the larger exponent being processed when said first exponent and said second exponent are not equal;

generating a second signal representing the magnitude of the arithmetic difference between the exponents of said numbers being processed;

adjusting the mantissa of one of said floating point numbers in response to said second signal;

generating an indicator signal when a specified number of least significant digits of said adjusted mantissa are not all zeros, said number of least significant digits being specified by said second signal; and performing normalization and precision rounding on said unnormalized resulting mantissa, said precision rounding being performed accordance with said indicator signal.

13. The method recited in claim 12 wherein:

said step of generating an indicator signal comprises detecting a plurality of consecutive digits of said specified number of least significant digits having all zeros in accordance with said second signal;

comparing said zero detect output to said second signal representing the magnitude of the arithmetic difference between the exponents of the numbers being processed; and generating said indicator signal when said magnitude of the arithmetic difference is greater than said detected plurality of consecutive zero digits.

14. A floating point computation unit performing a precision rounding operation during an arithmetic operation comprising:

means for processing a first mantissa and a second mantissa of floating point numbers;

means for processing a first exponent and a second exponent of said floating point numbers, said exponent processing means generating a first signal indentifying the larger exponent being processed when said first exponent and said second exponent are not equal, said first signal being coupled to said mantissa processing means, and said exponent processing means generating a second signal representing the magnitude of an arithmetic difference between the exponents of said numbers being processed;

said mantissa processing means comprising a shifter mesn for adjusting the mantissa of one of said floating point numbers in response to said second signal generated by said exponent processing means; and an indicator generator means, coupled to said shifter means and being fed by a selected one of either said first mantissa or said second mantissa, for generating an indicator signal when a plurality of least significant digits of said selected mantissa are not all zeros, the number of said least signainficant digits being specified by said second signal generated by said exponent processing means.

15. The floating point computation unit recited in claim 14 wherein:

said mantissa processing means further comprises multiplexer means for selecting either said first mantissa or said second mantissa in response to said first signal generated by said exponent processing means for coupling to said shifter means.

16. The floating point computation unit recited in claim 15 wherein:

said mantissa processing means further comprises an arithmetic-logic unt means for performing addition and subtraction arithmetic operations.

17. The floating point computation unit recited in calim 16 wherein:

said arithmetic-logic unit means comprises a first input fed by the one of said first mantissa or said second mantissa not being coupled to said shifter means plus two guard digits and a second input fed by an output from said shifter means having n+2 digits; and said arithmetic logic means generates an n+2 digit output signal and an overflow signal.

* * * * *